J. ELLIS.
FABRIC CUTTING MACHINE.
APPLICATION FILED MAY 27, 1916.
1,286,263.
Patented Dec. 3, 1918.
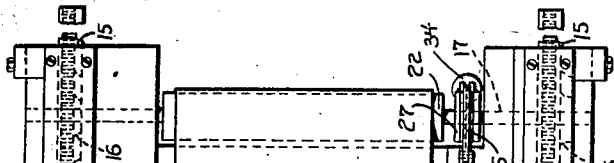
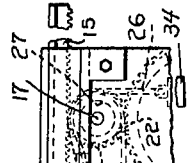

UNITED STATES PATENT OFFICE.

JOHN ELLIS, OF INDIANAPOLIS, INDIANA, ASSIGNOR TO G & J TIRE COMPANY, A CORPORATION OF INDIANA.

FABRIC-CUTTING MACHINE.

1,286,263.  Specification of Letters Patent.  Patented Dec. 3, 1918.

Application filed May 27, 1916. Serial No. 100,214.

*To all whom it may concern:*

Be it known that I, JOHN ELLIS, a citizen of the United States, residing at Indianapolis, county of Marion, and State of Indiana, have invented certain new and useful Improvements in Fabric-Cutting Machines, of which the following is a full, clear, and exact description.

This invention relates to fabric cutting machines and has for an object to provide a conveyer belt for a machine of this type which operates to feed the material under the knife independent of the finger bar.

In connection with the building of tires, machines are employed for cutting bias strips from a roll of rubber treated fabric, such strips subsequently being wound onto a ring core to form the carcass of the tire. The bias cutting machine embodies essentially a vertically reciprocating knife set at an oblique angle to the path of travel of the fabric for cutting bias strips from the fabric, a horizontally reciprocating finger bar which grasps the cut edge of the fabric after each descent of the knife and then measures off a suitable width of fabric to be cut by the next descent of the knife, and an endless conveyer which carries the bias cut strips away from the knife.

The disadvantage existing in a machine of this type is that distortion of the fabric occurs while it is being measured off by the finger bar. Since the fabric is cut at an angle of 45°, one side is pointed at the included angle of 45° while the other side is blunt at the included angle of approximately 135°. Therefore, it is evident that the pointed side does not contain as much fabric as the opposite side and will stretch more as the finger bar pulls it under the knife. To obviate this disadvantage, the present invention provides a conveyer belt which feeds the fabric to the knife independent of the finger bar, practically without distortion, so that more accurate widths of strips may be obtained than hitherto possible.

With the above and other objects in view, the invention consists in novel details of construction and combinations of parts hereinafter more fully described and claimed, it being understood that various modifications may be resorted to within the scope of the appended claims, without sacrificing any of the advantages or departing from the spirit of the invention.

The invention can be readily understood from the following description taken in connection with the accompanying drawing, in which—

Figure 1 is a fragmentary plan view of a bias cutting machine embodying my improvements.

Fig. 2 is a fragmentary side elevation of the parts shown in Fig. 1.

Referring now to the drawing in which like characters of reference designate similar parts; 10 designates the frame of the machine. A knife 11 is mounted on the frame of the machine and is set at an oblique angle to the path of travel of the fabric longitudinally of the frame. The knife is reciprocated vertically by suitable mechanism (not shown), to cut bias strips from the fabric. A finger bar 12 is mounted parallel to the knife on guides 13 fixed to the machine frame and is reciprocated horizontally toward and away from the knife by rods 14, each having a rack and pinion connection 15—16 with a drive shaft 17. The finger bar is equipped with fingers 18 which grasp the cut edge of the fabric at the inward limit of the movement of the finger bar, and during outward movement, the bar draws the fabric forwardly under the knife until a sufficient length is measured off for the next cut. The fingers release the fabric at the outward limit of movement of the finger bar just before the strip is severed by the knife. The bias cut strip then gravitates onto the endless conveyer 19 which conveys it away from the knife.

In carrying out the invention, an endless conveyer belt 20 is trained over rollers 21—22 that are journaled in the frame 10 as shown. The conveyer belt passes over the table 23 of the bias cutting machine and serves to support the fabric on the way to the knife. The belt is advanced intermittently by step movement to feed the fabric toward the knife while the finger bar is drawing the fabric under the knife, as will now be explained.

A bar 24 is mounted in guides 25 to slide longitudinally of the frame and a sprocket chain 26 is connected to the end of the bar 24 and engages the sprocket teeth of a ratchet controlled sprocket gear 27 on the conveyer belt roller 22. An arm 28 is adjustably secured to one of the rods 14 as shown at 29, and is terminally equipped with a pivoted hook 30 which is adapted to drop into a notch 31 formed in the bar 24 and slide the bar forward during forward stroke of the rod 14, thus advancing the conveyer belt in the direction of the arrow-head.

A throw-off block 32 is adjustably mounted on the frame in the path of a roller 33, carried by the hook 30, and operates to raise the hook out of the notch 31 approximately at the moment the finger bar releases its hold on the fabric before descent of the knife. The endless conveyer is thus halted. As soon as the hook releases the bar 24, a weight 34 on the sprocket chain returns the bar to initial position for the next stroke, the ratchet mechanism (not shown) of the sprocket gear permitting the gear to idle during return stroke of the bar. A stop 35 on the frame projects into the path of a pin 36 carried by the bar 24 and limits movement of the bar 24 under the influence of the weight.

For adjusting the throw-off block to time the release of the hook 30 for various widths of strips which may be cut by the knife, a rod 37 is secured to the throw-off block and is also secured to the usual adjusting mechanism for setting the machine to cut a strip of any desired width, so that upon setting of the said mechanism, the throw-off block will be correspondingly moved and will properly time the release of the hook to occur approximately at the moment the finger bar releases the fabric before descent of the knife.

In operation, when the rod 14 travels forward in measuring off a width of fabric under the knife, the hook 30 engages the sliding bar 24 at notch 31 and carries the bar forward, thereby moving the conveyer belt upon which the fabric is supported, toward the knife, by the instrumentality of the sprocket chain 26 and sprocket gear 27. At the moment the roller 33 strikes the throw-off block 32, the hook is disengaged from the bar 24 whereupon the conveyer belt is halted. The finger bar simultaneously releases its hold on the fabric and then the knife descends and completes the operation. After the hook releases the bar 24, the bar is slid back by the action of the weight 34, the sprocket gear 27 now idling so that the conveyer belt remains stationary.

It will thus be seen that the conveyer belt is intermittently actuated to support and carry the fabric toward the knife by step movements. Thus the conveyer belt operates to feed the fabric to the knife independent of the finger bar so that the distorting effects of the latter on the fabric when made to perform the entire feeding operation are positively obviated.

Having thus described my invention, what I claim as new and desire to protect by Letters Patent is:

1. A machine of the class described, comprising a knife for cutting bias strips from a web of material, a finger bar for feeding the material under the knife, and conveyer means for pushing the portion of the web adjacent the knife toward the knife, said conveyer means affording a plane supporting surface for the web.

2. A machine of the class described, comprising a knife for cutting bias strips from a web of material, a finger bar, a conveyer belt for supporting the material, means for intermittently driving the conveyer belt to feed the material adjacent the knife toward the knife, and means for moving the finger bar to carry the material under the knife during actuation of the conveyer belt.

3. A machine of the class described, comprising a knife for cutting bias strips from a web of material, a finger bar, a conveyer belt, and means for simultaneously moving the conveyer belt to carry the material adjacent the knife toward the knife and moving the finger bar to carry the material under the knife.

4. A machine of the class described, comprising a knife for cutting bias strips from a web of material, a finger bar for carrying the material under the knife, an endless conveyer belt for carrying the material toward the knife, and means for advancing the conveyer belt a step during each stroke of the finger bar away from the knife.

Signed at Indianapolis, county of Marion State of Indiana, this 20th day of May, 1916.

JOHN ELLIS.